(12) United States Patent
Guo et al.

(10) Patent No.: US 9,842,423 B2
(45) Date of Patent: Dec. 12, 2017

(54) SYSTEMS AND METHODS FOR PRODUCING A THREE-DIMENSIONAL FACE MODEL

(71) Applicant: QUALCOMM Incorporated, San Diego, CA (US)

(72) Inventors: Feng Guo, San Diego, CA (US); Ning Bi, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 13/936,867

(22) Filed: Jul. 8, 2013

(65) Prior Publication Data

US 2015/0009207 A1  Jan. 8, 2015

(51) Int. Cl.
 *G06T 15/00* (2011.01)
 *G06T 7/593* (2017.01)

(52) U.S. Cl.
 CPC .............. *G06T 15/00* (2013.01); *G06T 7/593* (2017.01); *G06T 2207/30201* (2013.01)

(58) Field of Classification Search
 CPC  G06T 2207/10012; G06T 17/00; G06T 15/00
 See application file for complete search history.

(56) References Cited

U.S. PATENT DOCUMENTS

| 8,401,276 | B1 | 3/2013 | Choe et al. | |
| 2004/0202385 | A1* | 10/2004 | Cheng | G06K 9/42 382/305 |
| 2007/0247524 | A1* | 10/2007 | Yoshinaga | G06K 9/0061 348/78 |
| 2009/0304232 | A1* | 12/2009 | Tsukizawa | 382/103 |
| 2011/0080466 | A1 | 4/2011 | Kask et al. | |
| 2012/0068996 | A1* | 3/2012 | Berestov et al. | 345/419 |
| 2012/0162374 | A1 | 6/2012 | Markas et al. | |
| 2012/0212627 | A1* | 8/2012 | Klose | H04N 9/3182 348/189 |
| 2012/0229609 | A1 | 9/2012 | Yamada et al. | |
| 2013/0063549 | A1 | 3/2013 | Schnyder et al. | |

(Continued)

FOREIGN PATENT DOCUMENTS

| CN | 1595280 A | 3/2005 |
| CN | 101159015 A | 4/2008 |
| CN | 102426712 A | 4/2012 |

OTHER PUBLICATIONS

Chow C.K., et al., Recovering Shape by Shading and Stereo Under Lambertian Shading Model, International Journal of Computer Vision, Kluwer Academic Publishers, BO, vol. 85, No. 1, May 5, 2009 (May 5, 2009), pp. 58-100, XP019734450, ISSN: 1573-1405.

(Continued)

*Primary Examiner* — Weiming He
(74) *Attorney, Agent, or Firm* — Austin Rapp

(57) ABSTRACT

A method for three-dimensional face generation is described. An inverse depth map is calculated based on a depth map and an inverted first matrix. The inverted first matrix is generated from two images in which pixels are aligned vertically and differ horizontally. The inverse depth map is normalized to correct for distortions in the depth map caused by image rectification. A three-dimensional face model is generated based on the inverse depth map and one of the two images.

44 Claims, 10 Drawing Sheets

(56) References Cited

U.S. PATENT DOCUMENTS

2013/0236089 A1* 9/2013 Litvak .............. G06K 9/00382
382/154
2014/0368613 A1* 12/2014 Krupka ............. H04N 13/0022
348/46

OTHER PUBLICATIONS

International Search Report and Written Opinion—PCT/US2014/042185—ISA/EPO—Sep. 22, 2014.
Maitre M., et al., "Symmetric Multi-view Stereo Reconstruction from Planar Camera Arrays", Computer Vision and Pattern Recognition, 2008. CVPR 2008. IEEE Conference on, IEEE, Piscataway, NJ, USA, Jun. 23, 2008 (Jun. 23, 2008), pp. 1-8, XP031296983, ISBN: 978-1-4244-2242-5.
Li-Liang L., et al., "Multi-View Images Rectification based on Common Points Extraction", Signal Processing, vol. 27, No. 6, Jun. 30, 2011, 7 Pages.
Yong B., "The Multi-gesture Face Image Build Method on Stereo Vision", Information technology series of China excellent master's thesis, vol. 2009, No. 7, Jul. 15, 2009.

* cited by examiner

SYSTEMS AND METHODS FOR PRODUCING A THREE-DIMENSIONAL FACE MODEL

TECHNICAL FIELD

The present disclosure relates generally to electronic devices. More specifically, the present disclosure relates to systems and methods for producing a three-dimensional (3D) face model.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

New and/or improved features of electronic devices are often sought for. As can be observed from this discussion, systems and methods that add new and/or improved features of electronic devices may be beneficial.

SUMMARY

Figure 1:
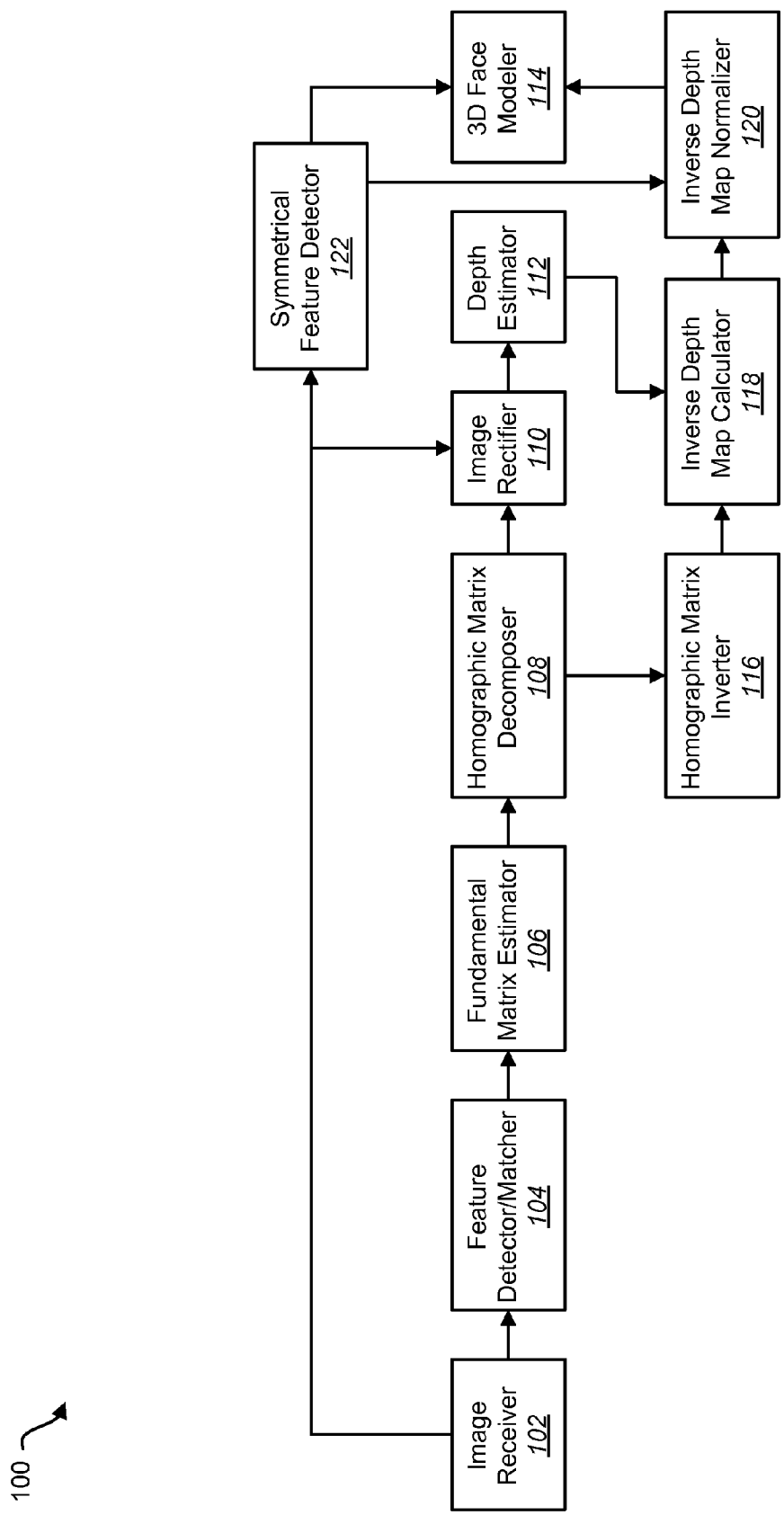
FIG. 1 is a block diagram illustrating components for producing a three-dimensional (3D) face model.

A method for three-dimensional face generation is described. An inverse depth map is calculated based on a depth map and an inverted first matrix. The inverted first matrix is generated from two images in which pixels are aligned vertically and differ horizontally. The inverse depth map is normalized to correct for distortions in the depth map caused by image rectification. A three-dimensional face model is generated based on the inverse depth map and one of the two images.

A first matrix that corresponds to a first image of the two images may be obtained. A second matrix that corresponds to a second image of the two images may be obtained. The first matrix may be applied to the first image to obtain a first rectified image. The second matrix may be applied to the second image to obtain a second rectified image. The first matrix may be a homographic matrix corresponding to the first image and the second matrix may be a homographic matrix corresponding to the second image.

Calculating the inverse depth map may include inverting the first matrix to obtain the inverted first matrix and applying the inverted first matrix to the depth map. The depth map may be determined from the first rectified image and the second rectified image. A fundamental matrix may be determined from the two images. Obtaining the first matrix and the second matrix may include decomposing the fundamental matrix.

The two images may be different perspectives relative to a human face. Normalizing the inverse depth map may include normalizing a subset of pixels in the inverse depth map. Normalizing the inverse depth map may include one of rotating, tilting and scaling the inverse depth map.

Tilting the inverse depth map may include determining depth derivatives for each column of pixels in a subset selection of the inverse depth map, determining a mean value of all the depth derivatives for the subset selection, comparing the mean value to a threshold value and tilting the inverse depth map based on the comparison. The subset selection may include a rectangular area. The subset selection may include a first area and a second area. Comparing the mean value to a threshold value may also include comparing a difference between the mean value of the first area and the mean value of the second area to a threshold value.

Rotating the inverse depth map may include detecting symmetrical features in the inverse depth map, the symmetrical features having a left feature and a right feature, and adjusting the inverse depth map proportionally to make the left feature and the right feature horizontally level.

Scaling the inverse depth map may include detecting symmetrical features in the inverse depth map, the symmetrical features having a left feature and a right feature, and adjusting the inverse depth map to make the left feature and the right feature proportionally even and at the same depth level.

An apparatus for three-dimensional face generation is also described. The apparatus includes a processor and executable instructions stored in memory that is in electronic communication with the processor. The apparatus calculates an inverse depth map based on a depth map and an inverted first matrix. The inverted first matrix is generated from two images in which pixels are aligned vertically and differ horizontally. The apparatus also normalizes the inverse depth map to correct for distortions in the depth map caused by image rectification. The apparatus further generates a three-dimensional face model based on the inverse depth map and one of the two images.

Another apparatus for three-dimensional face generation is described. The apparatus includes means for calculating an inverse depth map based on a depth map and an inverted first matrix. The inverted first matrix is generated from two images in which pixels are aligned vertically and differ horizontally. The apparatus also includes means for normalizing the inverse depth map to correct for distortions in the depth map caused by image rectification. The apparatus further includes means for generating a three-dimensional face model based on the inverse depth map and one of the two images.

A computer-program product for three-dimensional face generation is described. The computer-program product includes a non-transitory computer-readable medium with instructions thereon. The instructions include code for causing an electronic device to calculate an inverse depth map based on a depth map and an inverted first matrix. The inverted first matrix is generated from two images in which pixels are aligned vertically and differ horizontally. The instructions also include code for causing the electronic device to normalize the inverse depth map to correct for distortions in the depth map caused by image rectification. The instructions further include code for causing the electronic device to generate a three-dimensional face model based on the inverse depth map and one of the two images.

DETAILED DESCRIPTION

A three-dimensional (3D) face model can be used for different applications, such as virtual reality and face recognition. 3D models may be generated from a set of two-dimensional (2D) images. For example, a set of 2D pictures displaying an image of a face may be used to create a 3D rendering of the face. For instance, 3D face model reconstruction using two images captured by a phone may provide a low-cost solution compared with studio environments.

In one known approach, a 3D face model is constructed from two stereo images. In this approach, camera calibration is not necessary. But this approach uses epipolar geometry to estimate the depth directly. To find the corresponding epipolar lines between two images, it requires face images to be taken in front of a white board. On the white board, a black rectangle must be included and is positioned such that the height of the target face fits within the black rectangle. In this approach, the images must be manually hand-coded for any extreme color on the four corners of the rectangle. Accordingly, this approach has limited applications and requires substantial user interaction.

In other known stereo camera-based 3D face reconstruction approaches, the stereo camera hardware and camera require calibration. Camera calibration can be complex, costly and time consuming, and it may require substantial user interaction.

In another known approach, a generic face model and several 2D face images are used to construct a 3D face. The facial features are matched and the generic face model is fitted to these feature points. The structure of the face depth is then computed. But this approach depends on the architecture of the generic face model, facial feature detection, etc. This approach may not capture the subject's natural face. In other words, this approach may distort a subject's face in applying it to the general face model.

Similarly, in another known approach involving 3D face reconstruction with a single view camera, a face is reconstructed into a 3D structure using a single 2D image. This approach employs a database of the objects (e.g., face models) containing example patches. In this approach, the data sets used in practice do not guarantee the presence of objects sufficiently similar to the query for accurate reconstructions.

Many current 3D image-generating methods, however, use an image rectification process that causes distortions to a subject's face when rendered as a 3D face model. Image rectification generally includes detection and matching of a set of corresponding points between a pair of 2D images. Under this approach, the rectified images are left skewed and distorted. In other approaches, manual modifications and corrections are required to eliminate distortion caused by image rectification.

Therefore, the present systems and methods may provide improved methods and configurations for automatically producing a 3D face model from two 2D images, for example, taken by a single camera. In some configurations, an inverse matrix may be employed to automatically correct image distortion with minimal user interaction. In some configurations, rotating, tilting and scaling may correct image distortion. Systems and methods for 3D face generation and producing a 3D face model are explained in greater detail below.

FIG. 1 is a block diagram of a method 100 illustrating components for producing a 3D face model. Each component may be implemented in hardware or software. For example, FIG. 1 may be implemented on an electronic device (not shown). Examples of electronic devices include laptop or desktop computers, cellular phones, smart phones, wireless devices, e-readers, tablet devices, gaming systems, etc. Some of these devices may operate in accordance with one or more industry standards.

Components in FIG. 1 include an image receiver 102, a feature detector/matcher 104, a fundamental matrix estimator 106, a homographic matrix decomposer 108, an image rectifier 110, a depth estimator 112 and a 3D face modeler 114. FIG. 1 also illustrates a homographic matrix inverter 116, an inverse depth map calculator 118, an inverse depth map normalizer 120 and a symmetrical feature detector 122. The components may be implemented on a single device or may be implemented on multiple devices. Each of these components will be discussed below in greater detail.

The image receiver 102 may receive a set of two images (e.g., raw data) of a subject's face. The two images may be different perspectives relative to a face. In other words, the images may be such that the pixels in the two images are different vertically and horizontally. In one configuration, the image receiver 102 may be a single camera that takes two pictures. The first picture and the second picture may be taken at the same horizontal level, but the camera may be slightly moved or rotated left or right along a horizontal axis, thus producing slightly different images.

In another configuration, the image receiver 102 may be a module that receives image input from an exterior device. For example, the image receiver 102 may be implemented on an electronic device and receive an image taken by a camera phone or tablet device. In some configurations, the image receiver 102 may be located on the same electronic device that captures the set of images.

The feature detector/matcher 104 may correlate the pixels of the first image with corresponding pixels of the second image. For instance, the feature detector/matcher 104 may detect facial features such as eyes, nose, mouth, etc., in each of the two images and match pixels from one feature in the first image to corresponding pixels of the same feature in the second image.

The fundamental matrix estimator 106 may generate a fundamental matrix (H). A fundamental matrix may be a 3×3 matrix that relates to corresponding points in stereo images, e.g., the set of two images. The fundamental matrix may be estimated based on a number of matched features, points or pixels between the two images. In general, a fundamental matrix may be estimated based on at least seven corresponding points, however, more or fewer corresponding points may be employed in estimating a fundamental matrix.

In some configurations, a matrix estimator may generate another type of matrix from two images in which pixels are aligned vertically and differ horizontally. In other words, another type of matrix that is generated from two stereo images, other than a fundamental matrix, may be used.

The homographic matrix decomposer 108 may decompose one or more homographic (i.e., projective transformation) matrices from a fundamental matrix, such as a 3×3 homographic matrix, for example. A homographic matrix may provide rotation and translation information of a camera between two images. A pair of homographic matrices, such as a first homographic matrix ($P_L$) and a second homographic matrix ($P_R$), may be decomposed from a fundamental matrix. The first homographic matrix may correspond to the first image and the second homographic matrix may correspond to the second image.

The image rectifier 110 may rectify the two images by projecting the two images onto a common image plane. For example, the image rectifier 110 may apply the first homographic matrix to the first image and the second homographic matrix to the second image. The image rectifier 110 may produce rectified images (e.g., a first rectified image and a second rectified image). In some configurations, the image rectifier 110 projects stereo images onto a common image plane parallel to a line between optical centers in such a way that the corresponding points have the same row coordinates. In this manner, the problem associated with 2D stereo correspondence is reduced to a one dimensional (1D) problem.

The depth estimator 112 may determine a depth map. A depth map may be an image or image channel that includes information relating to the distance of the surfaces of scene objects from a viewpoint, such as a camera. A depth map may provide depth values indicating the differences in depths between two rectified images. The depth estimator 112 may generate a depth map from a set of two rectified images.

The 3D face modeler 114 may generate a 3D face model based on a depth map and one of the two images. For example, the 3D face modeler 114 may align detected features in an image with a depth map. In some configurations, the 3D face modeler 114 may employ an inverse depth map in generating a 3D face model.

The homographic matrix inverter 116 may invert a homographic matrix. The homographic matrix inverter 116 may inverse a homographic matrix to obtain an inverted homographic matrix, such as a 3×3 inverted homographic matrix, for example. The homographic matrix inverter 116 may obtain an inverted first homographic matrix ($P_L^{-1}$) and an inverted second homographic matrix ($P_R^{-1}$).

The inverse depth map calculator 118 may calculate or map an inverse depth map. For example, the inverse depth map calculator 118 may map a depth map to an inverted homographic matrix to obtain an inverse depth map. An inverse depth map may correct for some distortions in the depth map caused by image rectification.

The inverse depth map normalizer 120 may adjust and normalize an inverse depth map. The normalizations may include tilting, rotating, scaling, etc., an inverse depth map. For example, the inverse depth map normalizer 120 may detect distortions in an inverse depth map and may perform adjustments accordingly. In some configurations, the inverse depth map normalizer 120 may adjust a subset of pixels in the inverse depth map. In some configurations, the inverse depth map normalizer 120 may normalize a non-inverted depth map. In other words, the inverse depth map normalizer 120 may normalize the depth map 242 directly.

The symmetrical feature detector 122 may detect symmetrical features in an image, such as a human face. For example, the symmetrical feature detector 122 may detect symmetrical features such as eyes, ears, lips, a nose, forehead areas, cheeks, glasses, eyebrows, etc.

The components illustrated in FIG. 1 may produce a 3D face model. For example, given two stereo images of a face, a depth map may be estimated and the background part of the depth map can be set as the flat plane. With a known depth value, the 3D coordinates of the face points may be calculated and the 3D face may be reconstructed as a 3D face model.

In one approach, the image receiver 102 may receive a set of images. The set of images may include a first image and a second image, a left image and a right image, a top image and a bottom image, two stereo images, etc. The two images in the set of images may include corresponding pixels that are aligned vertically, but differ horizontally. In some configurations, the pixels between the two images may be aligned horizontally, but not vertically.

The image receiver 102 may provide the set of images to the feature detector/matcher 104. For example, the image receiver 102 may send the images over a wired connection, wirelessly or via a storage medium.

Figure 2:
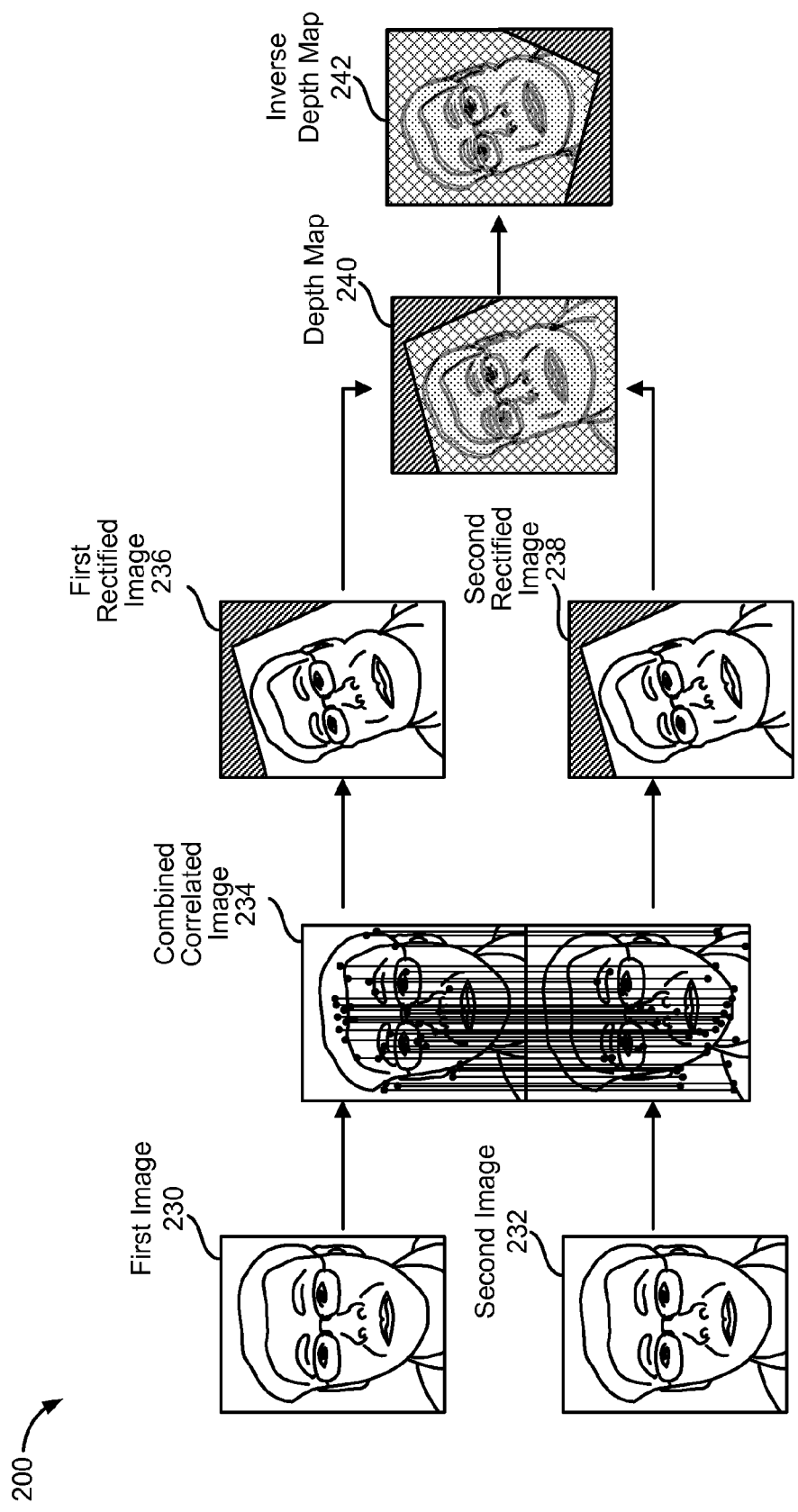
FIG. 2 illustrates a process for producing an inverse depth map.

The feature detector/matcher 104 may identify corresponding features in the two images and may match the corresponding images together. An illustration of feature matching is shown in FIG. 2, described below.

The feature detector/matcher 104 may provide correlated and matched images to the fundamental matrix estimator 106. Once a certain number of pixels have been matched, the feature detector/matcher 104 may provide this data to the fundamental matrix estimator 106.

The fundamental matrix estimator 106 may estimate a fundamental matrix (H) based on the correlated images. The fundamental matrix may then be decomposed by the homographic matrix decomposer 108 to obtain two homographic matrices ($P_L$ and $P_R$). In other words, the projective transformation matrices $P_L$ and $P_R$ for rectifying stereo images may be computed based on the fundamental matrix H.

The image rectifier 110 may use the homographic matrix matrices $P_L$ and $P_R$ to rectify the first image and second image. For example, the first homographic matrix $P_L$ may be mapped to a left image to produce a first rectified image and the second homographic matrix $P_R$ may be mapped to a right image to produce a second rectified image.

An example of the image rectification process will now be given. In one configuration, image rectification includes detecting and matching a set of corresponding points between the two images by the feature detector/matcher 104. The correctly matched points are used to compute the fundamental matrix H by the fundamental matrix estimator 106 such that $X_R^T H X_L = 0$, where $X_L$ is a point (e.g., pixel) in a left image and $X_R$ is a corresponding point (e.g., pixel) in a right image. In other words, $X_L$ and $X_R$ may each represent a 2D point that can be written as a 3D column vector in a [x, y, 1] format. T may represent a matrix transpose. Thus, when the 3D column vector is transposed, the result is a 3D row vector, written as [x, y, 1] (e.g., column vector $[x, y, 1]^T$ = row vector [x, y, 1]).

In this configuration, $P_L$ and $P_R$ are 3×3 matrices decomposed from a 3×3 fundamental matrix H by the homographic matrix decomposer 108. Given $P_L$ and $P_R$, the image rectifier 110 applies 2D projective transformations on the two images. Here, rectifying the images changes each image pixel (X) from a raw data pixel, written as $X=[x, y, 1]^T$, to a rectified image pixel, written as $X_L' = P_L X_L$ or $X_R' = P_R X_R$.

Further, in this configuration, there is no need for camera intrinsic and extrinsic parameters.

However, in this configuration, the pair of homographic matrices $P_L$ and $P_R$ is not unique because the two stereo-rectified images are stereo-rectified under a common rotation. In other words, the pair of homographic matrices $P_L$ and $P_R$ share a common rotation, based on the difference between the two images, rotated around a common baseline. As a result, undesirable distortion to the rectified images, specifically skewness and aspect/scale distortions may be introduced. An illustration of this distortion is shown and described below in FIG. 2.

Once the set of images are rectified, the two rectified images may be used by the depth estimator 112 to determine a depth map. In other words, given the reconstructed stereo images, a depth reconstruction may be determined. But if the rectified images are distorted, the depth map may be similarly distorted. Thus, under this approach, image rectification causes undesirable distortions in the depth map, which may lead to a distorted 3D face model if not corrected.

To correct for the distortion in the depth map caused by image rectification, an inverse depth map may be generated by the inverse depth map calculator 118. The inverse depth map calculator 118 may obtain a depth map from the depth estimator 112 and an inverted homographic matrix from the homographic matrix inverter 116. The homographic matrix inverter 116 may invert the homographic matrix obtained from the homographic matrix decomposer 108 as described above.

The inverse depth map calculator 118 may map the depth map to the inverted homographic matrix to produce an inverse depth map. For example, given a depth map (M) estimated from the two rectified stereo images, M may be inversely mapped to one of original images by applying an inverse matrix such as $P_L$ or $P_R$. In this example, a pixel (m) in M, written as $m=[x, y, z]^T$, will become a new pixel (m'), written as $m'=P_L^{-1}$ m. Thus, after inverse mapping, m', [x', y', z'] as part of an inverse depth map (M'). In the above examples, z represents a pixel value in the depth map and z' represents a pixel value in the inverse depth map.

Inverting the depth map may partially correct distortions in the depth map caused by the image rectification process. For example, skewness and aspect/scale distortions may be corrected. In addition to partially correcting for distortions in the depth map caused by the image rectification process, normalizations to the depth map/inverse depth map may be performed by the inverse depth map normalizer 120. Normalization may correct the inverse depth map to prevent the 3D face model from being improperly tilted, rotated and/or scaled. For example, the normalized pixel may be written as $[x_a, y_a]$ where $x_a=x'/z'$ and $y_a=y'/z'$. Accordingly, after normalization, the depth map may be on the same plane as the original image. Further, distortion on the 2D plane may be removed.

The inverse depth map normalizer 120 may receive input from the symmetrical feature detector 122. For example, the symmetrical feature detector 122 may send detected symmetrical features and patterns to the inverse depth map normalizer 120. The inverse depth map normalizer 120 may use the detected symmetrical features to perform adjustments to ensure that the detected symmetrical features are correctly proportioned. Additional detail regarding image normalization is discussed in greater detail below.

Once the inverse depth map is corrected and normalized, the 3D face modeler 114 may generate a 3D face model. The 3D face modeler 114 may map one of the original images to the inverse depth map, applying the detected features sent from the symmetrical feature detector 122 with corresponding points on the inverse depth map.

According to the systems and methods presented herein, it may be beneficial to invert the depth map and modify the inverse depth map based on face specific characteristics to reduce undesirable distortions during image rectification. Specifically, existing approaches, as descried previously, cause image distortion in the image rectification process and often require substantial user interaction. The systems and methods presented herein improve existing methods by inverting the depth map to partially account for distortion introduced in the image rectification process. Further corrections are applied by modifying and normalizing the inverse depth map based on face specific characteristics to improve the quality of the 3D face model. Moreover, the systems and methods presented herein require minimal user interaction.

FIG. 2 illustrates a process 200 for producing an inverse depth map 242. The process 200 may be implemented in hardware or software. For example, the process 200 may be implemented on an electronic device. In some configurations, the process 200 may correspond to the components described in connection with FIG. 1.

FIG. 2 illustrates a first image 230 and a second image 232. The first image 230 and the second image 232 may make up a set of stereo images. For example, the two images may be of a single face taken from different viewpoints. In some configurations, an object other than a face may be used.

In some configurations, more than two images may be employed. For example, any number of images, where the vertical pixels are all aligned, may be used. The images may be provided to an image receiver 102.

Given the two images taken of a human face from different viewpoints (e.g., the first image 230 and the second image 232), the raw, uncalibrated stereo images may be rectified. In rectifying the two images, the first image 230 may first be correlated with the second image 232 resulting in a combined correlated image 234. For instance, a feature detector/matcher 104 may detect and match the first image 230 and the second image 232. Then, a fundamental matrix estimator 106 may calculate a fundamental matrix based on linear projections of the matched points, as shown in the combined correlated image 234.

The first image 230 and the second image 232 may be used via the combined correlated image 234 to produce a first rectified image 236 and a second rectified image 238. For example, an image rectifier 110 may perform part of the image rectification process as described above. The first rectified image 236 and the second rectified image 238 may be distorted during the image rectification process, as shown in FIG. 2.

A depth map 240 may be determined from the first rectified image 236 and the second rectified image 238. For instance, a depth estimator 112 may generate the depth map 240. The depth map 240 may be distorted as a result of the first rectified image 236 and the second rectified image 238 being distorted.

To correct for this distortion, an inverse depth map 242 may be calculated. For example, an inverse depth map calculator 118 may calculate an inverse depth map 242. The inverse depth map 242 may be calculated by applying an inverted homographic matrix (e.g., $P_L^{-1}$ or $P_R^{-1}$) to the depth map 240. As illustrated in FIG. 2, the inverse depth map 242 may correct distortions such as skewness in the depth map 240 caused by image rectification.

Figure 3:
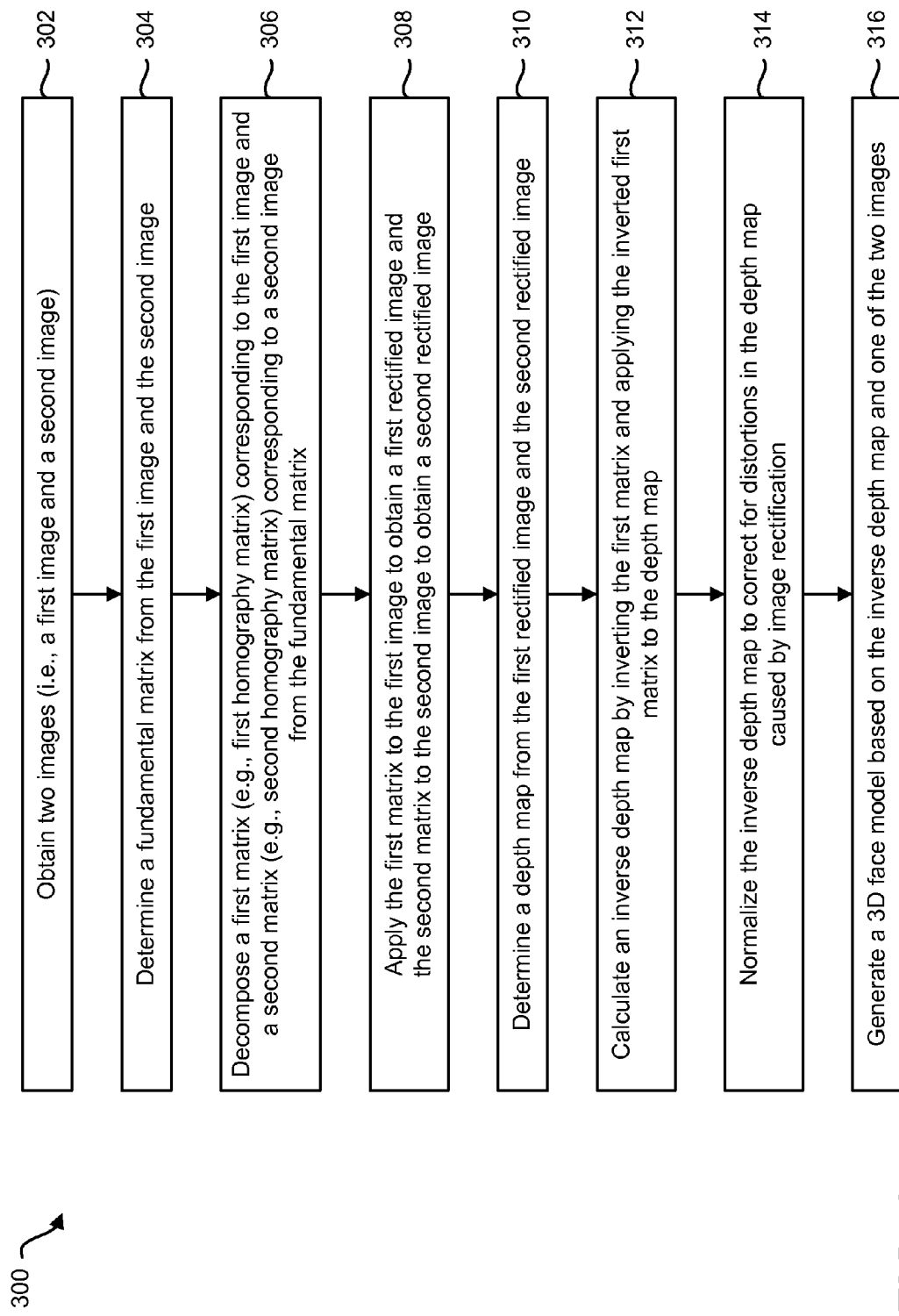
FIG. 3 is a flow diagram illustrating a method for producing a 3D face model.

FIG. 3 is a flow diagram illustrating a method 300 for producing a 3D face model. The method 300 may be implemented in hardware or software. For example, the method 300 may be implemented on an electronic device. An electronic device may obtain 302 two images, such as a first image 230 and a second image 232. The two images may be two stereo images received by an image receiver 102.

The electronic device may determine 304 a fundamental matrix from the first image 230 and the second image 232. The fundamental matrix (H) may be a 3×3 matrix that tracks corresponding points in the two stereo images. The fundamental matrix may be generated by a fundamental matrix estimator 106 based on a combined correlated image 234.

The electronic device may decompose 306 a first matrix corresponding to the first image 230 from the fundamental matrix. The electronic device may also decompose 306 a second matrix corresponding to the second image 232 from the fundamental matrix. For example, the first matrix and the second matrix may be homographic matrices $P_L$ and $P_R$, respectively, as described above. In some configurations, the first matrix and the second matrix may be $P_R$ and $P_L$, respectively, or some other matrices. In some configurations, the first and second matrices may be decomposed from a homographic matrix decomposer 108.

The electronic device may apply 308 the first matrix to the first image 230 to obtain a first rectified image 236. The electronic device may apply 308 the second matrix to the second image 232 to obtain a second rectified image 238. For example, an image rectifier 110 may map or project the first matrix to the first image 230 to produce a first rectified image 236. The second rectified image 238 may be generated similarly. Distortions may be introduced during image rectification.

The electronic device may determine 310 a depth map 240 from the first rectified image 236 and the second rectified image 238. The depth map 240 may be determined by a depth estimator 112. If the first rectified image 236 and the second rectified image 238 are distorted and skewed, then the depth map 240 will likely also be distorted and skewed. The depth map 240 may provide depth values indicating the differences in depths based on the first rectified image 236 and the second rectified image 238.

The electronic device may calculate 312 an inverse depth map 242. The inverse depth map 242 may be calculated by inverting the first matrix (or the second matrix) and applying the inverted matrix to the depth map 240. For example, an inverse depth map calculator 118 may perform these calculations. The inverted first matrix or inverted second matrix may be an inverted homographic matrix such as $P_L^{-1}$ or $P_R^{-1}$. A homographic matrix inverter 116 may provide the inverted first matrix or the inverted second matrix to the inverse depth map calculator 118 to obtain the inverse depth map 242.

The electronic device may normalize 314 the inverse depth map 242 to correct for distortions in the depth map caused by image rectification. An inverse depth map normalizer 120 may adjust for distortions, for example. Additional detail regarding normalization will be described in greater detail below.

The electronic device may generate 316 a 3D face model based on the inverse depth map 242 and one of the two images (e.g., the first image 230 or the second image 232). For instance, the 3D face modeler 114 may map one of the original images to the inverse depth map 242, which has been normalized. In generating the 3D face model, detected features from a symmetrical feature detector 122 may be mapped to corresponding points on the inverse depth map 242. The 3D face model does not include at least some of the distortions caused by image rectification because of the corrections performed by this method 300.

While calculating an inverse depth map may correct for some distortion, other distortions, such as skewness, scaling and rotating distortions, may still affect the inverse depth map. These distortions may be caused by depth dimension distortion created during image rectification. For example, the left eye may be distorted from the rectification process and the left eye may have a larger depth value than the right eye. Normalization may correct distortions not corrected by creating an inverse depth map.

To refine the depth map, face characteristics may be used. For example, left and right symmetrical features may be considered. As another example, tilting may be adjusted based on forehead and mouth areas. Scaling and rotation may also be adjusted based on symmetrical facial features, such as eyes, ears, lips, a nose, forehead areas, cheeks, glasses, eyebrows, etc. FIGS. 4-9 will describe various normalization processes in greater detail, such as tilting, scaling and rotating.

Figure 4:
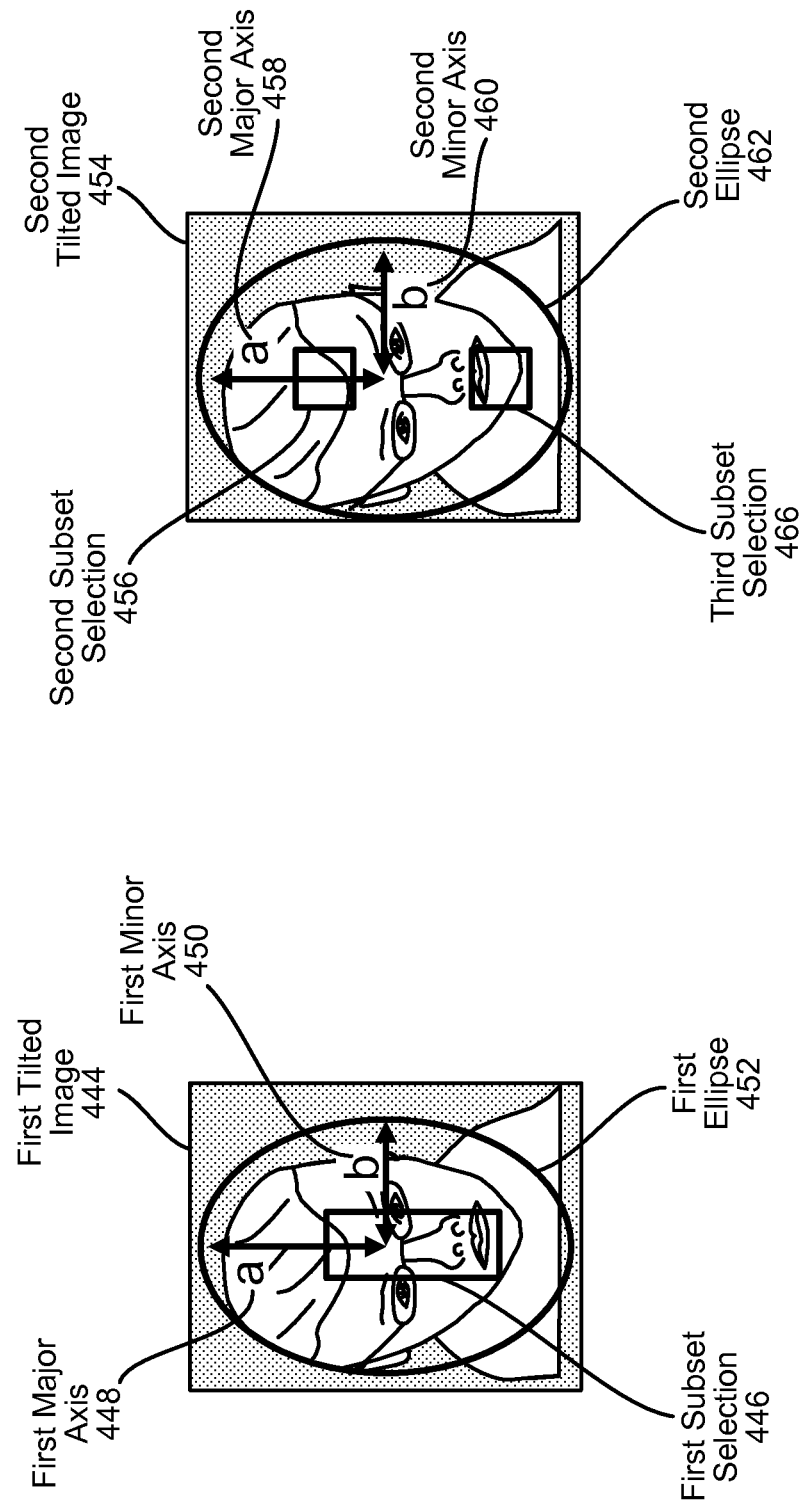
FIG. 4 illustrates two tilted images.

FIG. 4 illustrates two tilted images. The tilted images may be based on the inverse depth map 242. Over tilt in the tilted images may be corrected for by comparing different depth values in various parts of the inverse depth map 242, as will be described below. Adjusting and refining the tilting of the inverse depth map 242 may be one method of normalizing the inverse depth map 242.

The two tilted images in FIG. 4 may include a first tilted image 444 and a second tilted image 454. A first ellipse 452 may be modeled to match the perimeter of the face in the first tilted image 444. The first ellipse 452 may include a first major axis (a) 448 and a first minor axis (b) 450 and may help in detecting distortions, such as over tilt in the first tilted image 444. For example, over tilt may be detected by employing a first subset selection window 446. Over tilt may indicate that the image is tilted in either direction beyond an acceptable amount. In other words, an over tilted image may be tilted too far forward or tilted too far back about the first minor axis (b) 450.

The first subset selection window 446 may be rectangular; however, other shapes may be employed. In one configuration, the first subset selection window 446 may have a height of a/2 and a width of b/3. Other dimensions may be employed. In some configurations, the first subset selection window 446 may be co-centered with the first ellipse 452. In some configurations, the first subset selection window 446 may be centered with the nose area of the face on the first tilted image 444.

The second tilted image 454 may similarly include a second ellipse 462 that includes a second major axis (a) 458 and a second minor axis (b) 460. The second ellipse 462 may be modeled to correspond to the face in the second tilted image 454.

The second tilted image 454 may also include a second subset selection 456 and a third subset selection 466. The height and width of the second subset selection 456 and the third subset selection 466 may be equal; however, in some configurations, they may vary from one another. For example, the second subset selection 456 and the third subset selection 466 may have a height of a/4 and width of b/3. The second subset selection 456 and the third subset selection 466 may each be rectangular, or may be another type of shape, such as an ellipse. Further, the second subset selection 456 and the third subset selection 466 may be different shapes.

The second subset selection 456 may be positioned over the forehead area and the third subset selection 466 may be located over the mouth area of the second tilted image 454. In an ideal image used for rendering a 3D face model, the forehead and the mouth of a subject's face are located in the same plane. Thus, the second subset selection 456 and the third subset selection 466 may be compared to determine the tilt angle.

Determining tilt angle based on the first subset selection 446 or from the comparison of the second subset selection 456 and the third subset selection 466 is discussed below in FIGS. 5 and 6.

While normalizing (e.g., tilting, rotating, scaling, adjusting, etc.) the inverse depth map 242, the image foreground and background should be considered so that adjustments may be focused on a subject's face and not the background. In addition, distinguishing between the foreground and the background allows for smoothing between the two surfaces.

In one configuration, this may be performed by calculating a mean value of the face depth $f_m$. The mean value of the face depth may be used to set the background depth d, which should be a flat plane behind the 3D face model. The background depth should be less than the mean face depth, however, the difference should not vary significantly. If $d<w*f_m$, the image depth may be adjusted. Here, w is a coefficient to control a threshold so as to prevent the face depth from being adjusted when the image depth is being adjusted. In this way, the background and the face boundary may be merged smoothly so that there is no strong blur on the boundary.

Figure 5:
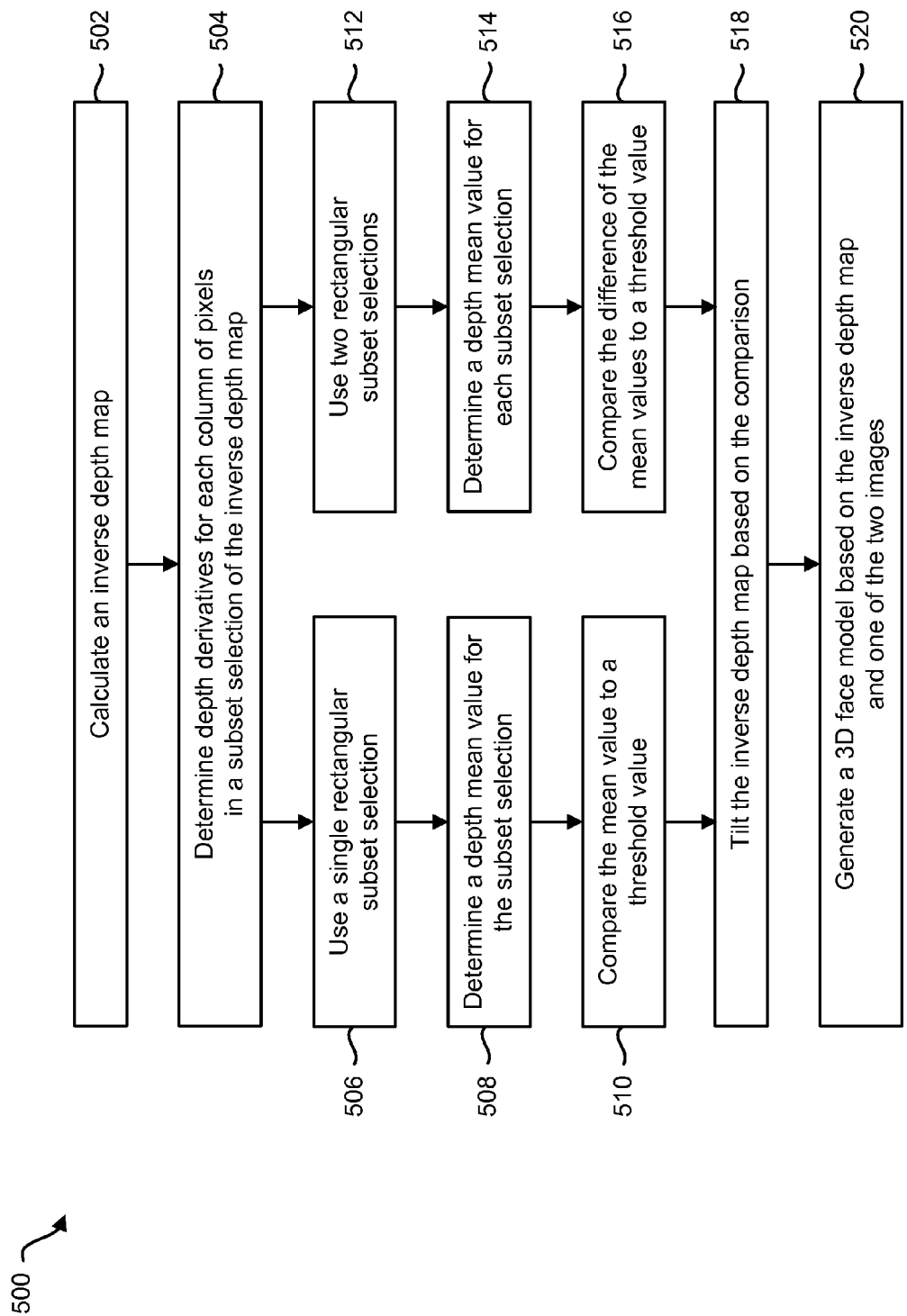
FIG. 5 is a flow diagram illustrating another method for producing a 3D face model.

FIG. 5 is a flow diagram illustrating another method 500 producing a 3D face model. The method 500 may be implemented in hardware or software. In some configurations, the method 500 may be implemented on an electronic device. The electronic device may calculate 502 an inverse depth map 242.

The electronic device may determine 504 depth derivatives for each column of pixels in a subset selection of the inverse depth map 242. For example, the subset selection may be a first subset selection 446, a second subset selection 456 or a third subset selection 466. The depth derivative may be computed for each vertical column in a subset selection. For example, each vertical column may be computed from the top to the bottom for each subset selection.

In one configuration, the electronic device may use 506 a single rectangular subset selection (e.g., the first subset selection 446). In this configuration, the electronic device may determine 508 a mean value (m) for the subset selection, i.e., for all depth derivatives in the single subset selection. In other words, each depth derivative may be averaged to calculate m.

The electronic device may compare 510 the mean value to a threshold value ($t_1$). If $|m|>t_1$, the face in the inverse depth map 242 may be classified as over-tilted and adjustments may be made until the condition of $|m|\le t_1$ is satisfied. In other words, the electronic device may tilt 518 the inverse depth map 242 based on the comparison. The electronic device may generate 520 a 3D face model based on the inverse depth map 242 and one of the two images, as described above.

In another configuration, the electronic device may use 512 use two rectangular subset selections (e.g., the second subset selection 456 and the third subset selection 466). The two rectangular subset selections may represent a first subset selection area and a second subset selection area.

The electronic device may determine 514 a mean value (m) for each subset selection. For example, the electronic device may determine 514 a first mean value ($m_1$) for the first subset selection area and a mean value ($m_2$) for the second subset selection area.

The electronic device may compare 516 the difference between the first area mean value and the second area mean value to a threshold value ($t_2$). For example, $|m_1-m_2|$ may equal a difference value (diff); duff may be compared to $t_2$. If $|diff|>t_2$, the inverse depth map 242 may be classified as over-tilted and adjustments may be made until the condition of $|diff|\le t_2$ is satisfied. In other words, the electronic device may tilt 518 the inverse depth map 242 based on the comparison. The threshold values (i.e., $t_1$ and $t_2$) may be based on empirical data, user preference, historical values, etc.

The electronic device may generate 520 a 3D face model based on the inverse depth map 242 and one of the two images. This may be performed as described above.

Figure 6:
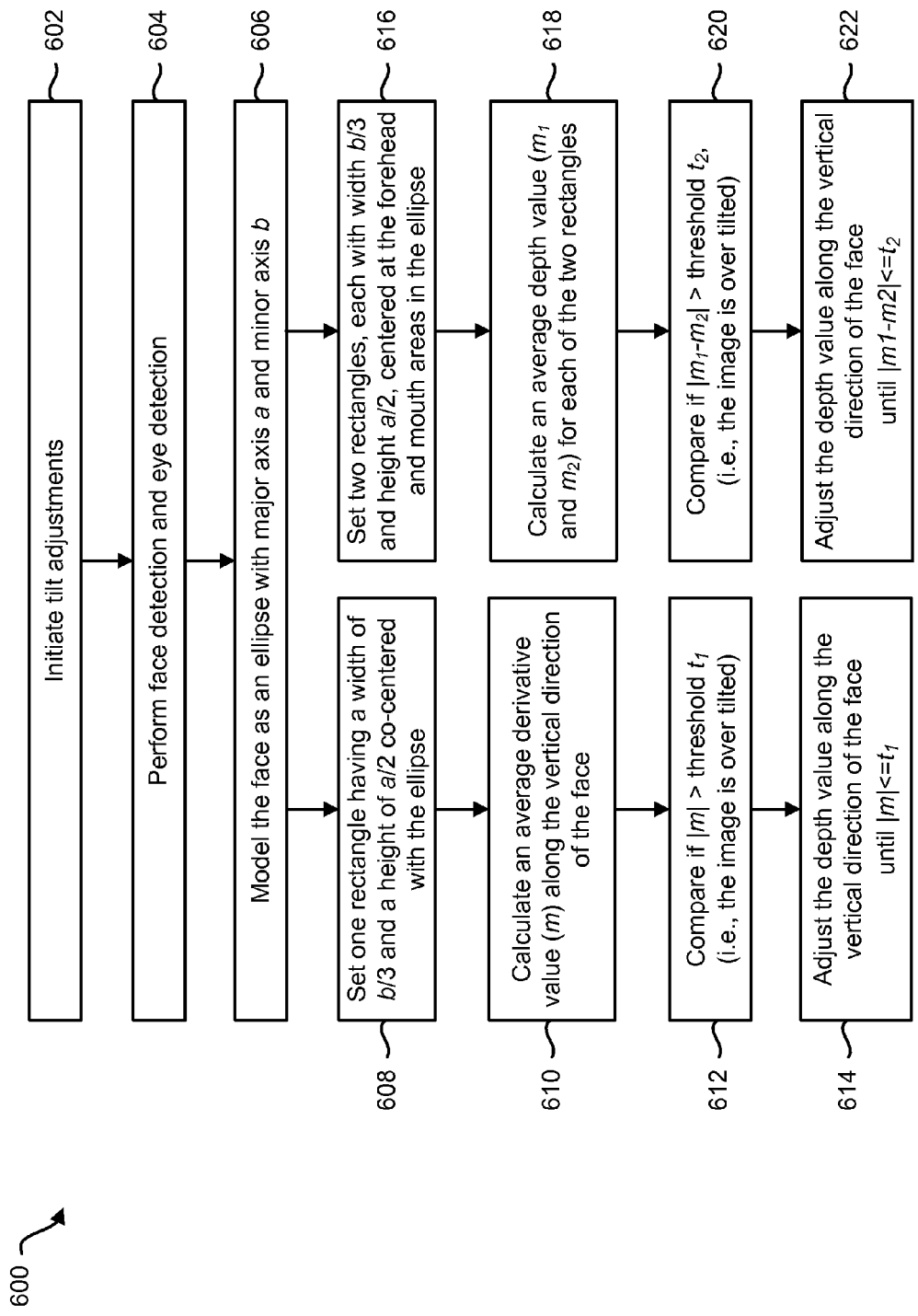
FIG. 6 is a flow diagram illustrating a method for tilting an inverse depth map.

FIG. 6 is a flow diagram illustrating a method 600 for tilting an inverse depth map 242. The method 600 may be implemented in hardware or software. For example, the method 600 may be implemented on an electronic device. This method 600 may be one example of normalizing an inverse depth map 242.

The electronic device may initiate 602 tilt adjustments. The electronic device may perform 604 face detection and eye detection. For example, face detection and eye detection may be performed on an inverse depth map 242 or one of the raw input images. In some configurations, performing 604 face detection and eye detection may be performed by a symmetrical feature detector 122.

The electronic device may model 606 the face as an ellipse with major axis a and minor axis b. For example, the ellipse may be like the first ellipse 452 or the second ellipse 462 described above in connection with FIG. 4.

In one configuration, the electronic device may set 608 one rectangle, co-centered with the ellipse. The rectangle may have a width of b/3 and a height of a/2. For example, the rectangle may be like the first subset selection 446 of FIG. 4.

The electronic device may calculate 610 an average derivative value (m) along the vertical direction of the face. The electronic device may compare 612 if $|m|>$threshold $t_1$ (i.e., the image is over tilted). In this case, the electronic device may adjust 614 the depth value along the vertical direction (e.g., about the minor axis (b)) of the face until $|m|<=t_1$.

In another configuration, the electronic device may set 616 two rectangles, each with width b/3 and height a/2, centered at the forehead and mouth areas in the ellipse. For example, the two rectangles may be like the second subset selection 456 and the third subset selection 466 of FIG. 4. The electronic device may calculate 618 an average depth value ($m_1$ and $m_2$) for each of the two rectangles. This may be performed as described in connection with FIG. 5 above. The electronic device may compare 620 if $|m_1-m_2|>$threshold $t_2$ (i.e., the image is over tilted). In this case, the electronic device may adjust 622 the depth value along the vertical direction (e.g., about the minor axis (b)) of the face until $|m_1-m_2|\le t_2$.

Figure 7:
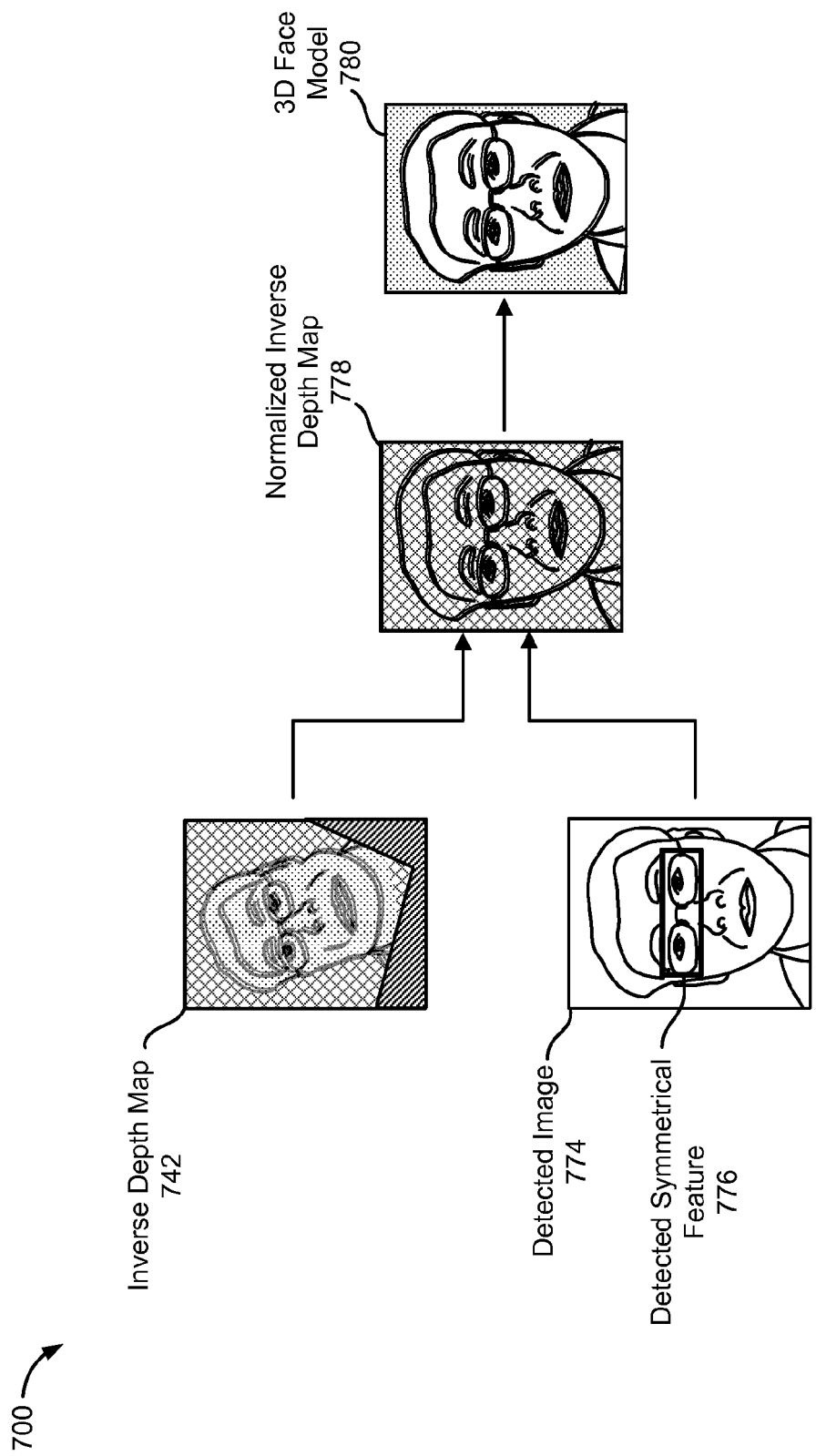
FIG. 7 illustrates a process for normalizing an inverse depth map.

FIG. 7 illustrates a process 700 for normalizing an inverse depth map 742. The process 700 may be implemented in hardware or software. For example, the process 700 may be implemented on an electronic device. In some configurations, the process 700 may correspond to the components described in connection with FIG. 1.

FIG. 7 illustrates an inverse depth map 742, which may correspond to the inverse depth map 242 described above.

FIG. 7 also illustrates a detected image 774, a normalized inverse depth map 778 and a 3D face model 780. The inverse depth map 742 may have been previously adjusted and corrected for over tilt. In other approaches, tilting may be adjusted later on.

In some configurations, the positions of the face area and the eyes may be detected, as shown in a detected symmetrical feature 776. Based on the left/right eye detection, the inverse depth map 742 may be adjusted proportionally to make the left and right sides on the same depth level. In other words, the detected image 774 may include a detected symmetrical feature 776, such as a pair of eyes. Other symmetrical features may include ears, lips, a nose, forehead areas, cheeks, glasses, eyebrows, etc.

The detected image 774 may be generated by a symmetrical feature detector 122. The detected image 774 may employ a first image 230 or a second image 232 from the set of stereo images. Alternatively, the detected image 774 may be a depth map 240 or an inverse depth map 742.

The inverse depth map 742 and the detected image 774 may be used in obtaining the normalized inverse depth map 778. For example, an inverse depth map normalizer 120 may generate a normalized inverse depth map 778 using the inverse depth map 742 and/or the detected image 774.

The 3D face model 780 may be generated based on the inverse depth map 742 and one of the two images (e.g., the first image 230 or the second image 232). For example, a 3D face modeler 114 may generate a 3D face model 780 to align detected symmetrical features 776 in an image with the inverse depth map 742.

Figure 8:
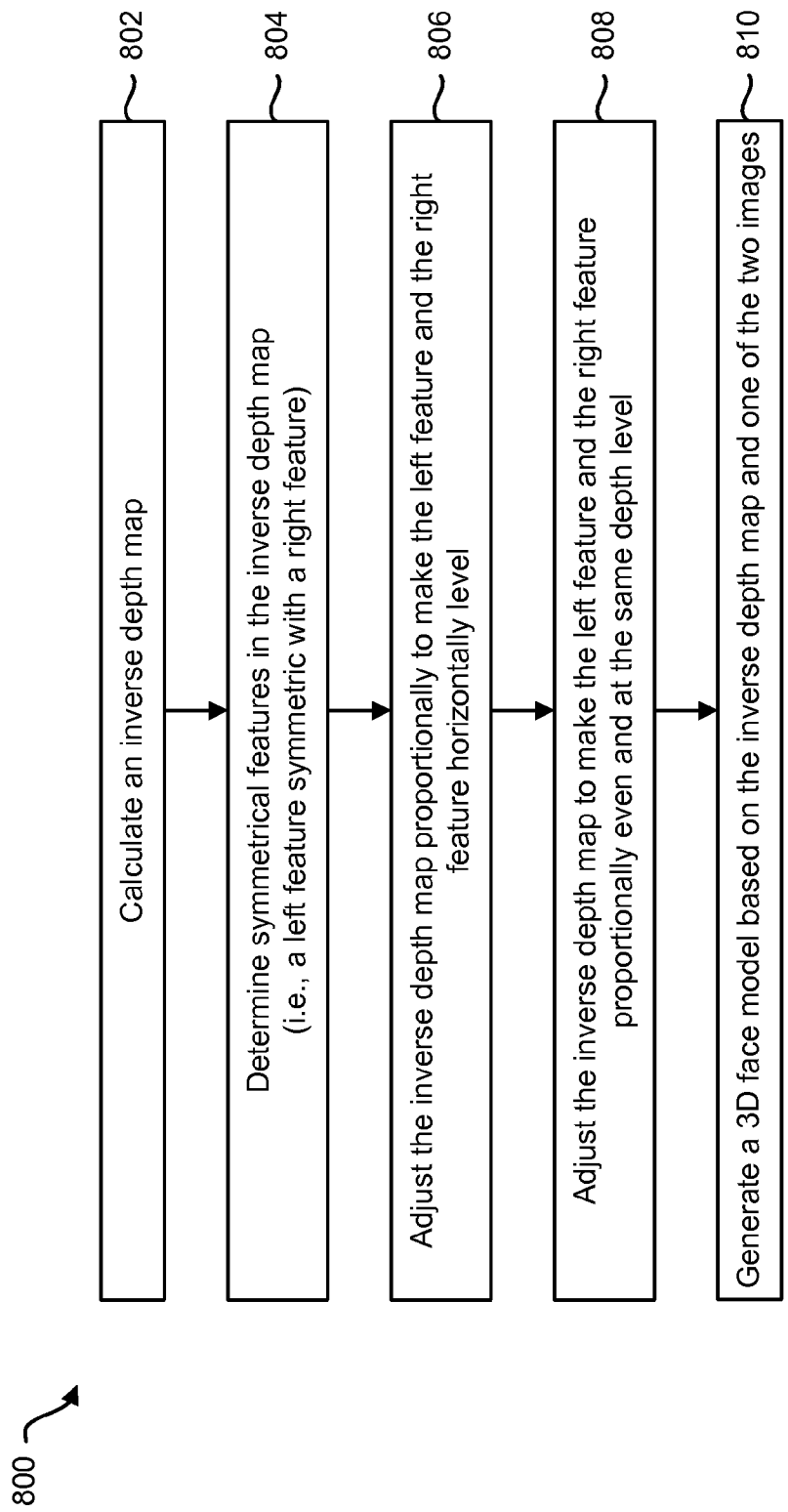
FIG. 8 is a flow diagram illustrating another method for producing a 3D face model.

FIG. 8 is a flow diagram illustrating another method 800 for producing a 3D face model 780. The method 800 may be implemented in hardware or software. For example, the method 800 may be implemented on an electronic device.

An electronic device may calculate 802 an inverse depth map 742, as described above. The electronic device may determine 804 symmetrical features in the inverse depth map 742. For example, a left feature symmetric with a right feature may be determined 804. The left feature and the right feature may be included as a detected symmetrical feature 776. Symmetrical features may be matched by a symmetrical feature detector 122. Symmetrical features may be based on known facial features or calculated from symmetrical-like features on corresponding sides of an image.

The left feature and the right feature may be, for example, a pair of eyes. The pair of eyes may not be proportional to each other. In other words, the left eye in the inverse depth map 742 may have a larger depth value than the right eye.

In one configuration, the electronic device may adjust 806 the inverse depth map 742 proportionally to make the left feature and the right feature horizontally level. For example, inverse depth map 742 may be rotated about an axis running perpendicular to the image to align the left feature and the right feature until they are horizontally level. This is explained in greater detail below in connection with FIG. 9.

In some configurations, the electronic device may adjust 808 the inverse depth map 742 to make the left feature and the right feature proportionally even and at the same depth level. In one example, the inverse depth map 742 may be rotated about a vertical axis until the left feature and the right feature are even.

In another example, the pixels in one or both features may be adjusted until the left feature and the right feature are proportionally even. For instance, given a set of eyes where the left eye is larger than the right eye, the depth level of the left eye may be decreased and/or the depth level of the right eye may be increased. In another instance, the size or scale of the left eye may be decreased and/or the size or scale of the right eye may be increased. A combination of adjustments may be performed to make the left feature and the right feature proportionally even and at the same depth level. In this manner the inverse depth map 742 may be adjusted until the left feature and the right feature are on the same plane. The electronic device may generate 810 a 3D face model 780 based on the inverse depth map 742 and one of the two images. This may be performed as described above.

Figure 9:
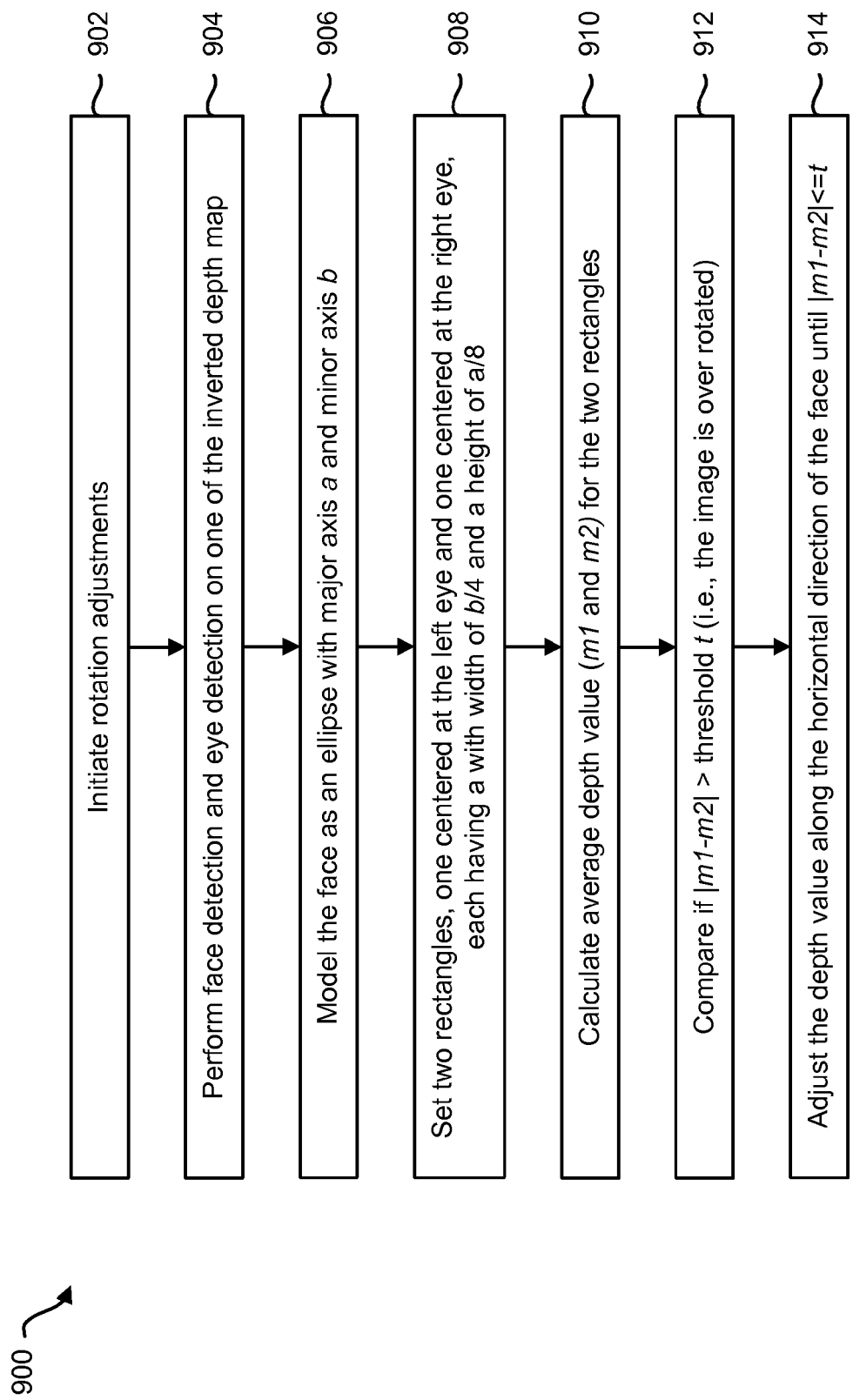
FIG. 9 is a flow diagram illustrating a method for normalizing an inverse depth map.

FIG. 9 is a flow diagram illustrating a method 900 for normalizing an inverse depth map 742. The method 900 may be implemented in hardware or software. For example, the method 900 may be implemented on an electronic device. In some configurations, this method 900 may be employed in connection with method 600 described in connection with FIG. 6 for tilting an inverse depth map 742.

The electronic device may initiate 902 rotation adjustments. The electronic device may perform 904 face detection and eye detection. For example, face detection and eye detection may be performed on an inverse depth map 742 or one of the raw input images. In some configurations, performing 904 face detection and eye detection may be performed by a symmetrical feature detector 122.

The electronic device may model 906 the face as an ellipse with major axis a and minor axis b. In one configuration, the ellipse may be similar to the first ellipse 452 or the second ellipse 462 described above in connection with FIG. 4.

In some configurations, the electronic device may set 908 two rectangles, one centered at the left eye and one centered at the right eye. Each rectangle may have a width of b/4 and a height of a/8. Other dimensions and shapes may be employed. For example, the two rectangles may each have a width of b/3 and a height of a/2. As another example, the two rectangles may have different dimensions from each other. Further, shapes other than rectangles may be employed.

The two rectangles may be like the second subset selection 456 and the third subset selection 466 of FIG. 4, but positioned over the eyes and having different dimensions.

The electronic device may calculate 910 the average depth value ($m_1$ and $m_2$) for the two rectangles. This may be performed as described in connection with FIG. 5 above. The electronic device may compare 912 if $|m_1 - m_2| >$ threshold t (i.e., the image is over rotated). In this case, the electronic device may adjust 914 the depth value along the horizontal direction (e.g., about the major axis) of the face until $|m_1 - m_2| \leq t$.

Figure 10:
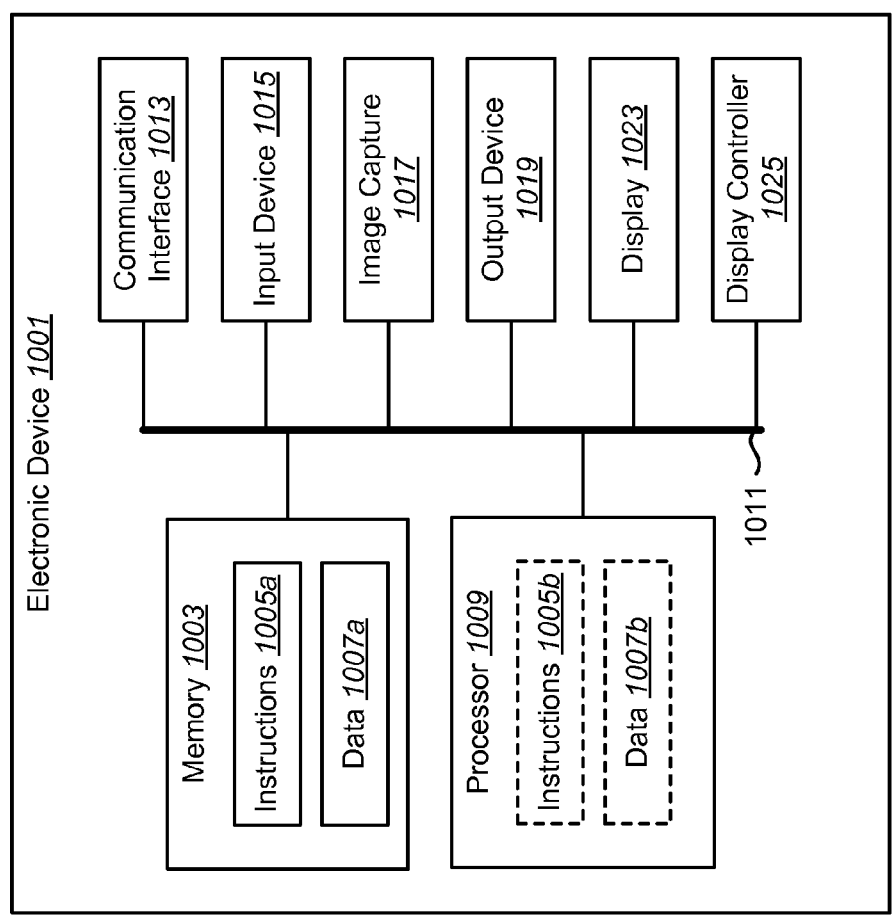
FIG. 10 illustrates certain components that may be included within an electronic device.

FIG. 10 illustrates certain components that may be included within an electronic device 1001. One or more of the electronic devices described above may be configured similarly to the electronic device 1001 that is shown in FIG. 10.

The electronic device 1001 includes a processor 1009. The processor 1009 may be a general purpose single- or multi-chip microprocessor (e.g., an ARM), a special purpose microprocessor (e.g., a digital signal processor (DSP)), a microcontroller, a programmable gate array, etc. The processor 1009 may be referred to as a central processing unit (CPU). Although just a single processor 1009 is shown in the electronic device 1001 of FIG. 10, in an alternative configuration, a combination of processors (e.g., an ARM and DSP) could be used.

The electronic device 1001 also includes memory 1003 in electronic communication with the processor 1009 (i.e., the processor 1009 can read information from and/or write information to the memory 1003). The memory 1003 may be any electronic component capable of storing electronic information. The memory 1003 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Instructions 1005a and data 1007a may be stored in the memory 1003. The instructions 1005a may include one or more programs, routines, sub-routines, functions, procedures, code, etc. The instructions 1005a may include a single computer-readable statement or many computer-readable statements. The instructions 1005a may be executable by the processor 1009 to implement one or more of the methods 300, 500, 600, 800 and 900, described above. Executing the instructions 1005a may involve the use of the data 1007a that is stored in the memory 1003. FIG. 10 shows some instructions 1005b and data 1007b being loaded into the processor 1009 (which may come from instructions 1005a and data 1007a).

In some configurations, the electronic device 1001 may include one or more image capture components 1017 for capturing images. In one configuration, an image capture component 1017 may be a camera or a photo cell for capturing images, such as stereo images.

The electronic device 1001 may also include one or more communication interfaces 1013 for communicating with other electronic devices. The communication interfaces 1013 may be based on wired communication technology, wireless communication technology, or both. Examples of different types of communication interfaces 1013 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1001 may also include one or more input devices 1015 and one or more output devices 1019. Examples of different kinds of input devices 1015 include a keyboard, mouse, microphone, remote control device, button, joystick, trackball, touchpad, lightpen, etc. For instance, the electronic device 1001 may include one or more image capture components 1017 for capturing images.

Examples of different kinds of output devices 1019 include a speaker, printer, 3D printer, etc. One specific type of output device 1019 which may be typically included in an electronic device 1001 is a display 1023. A display 1023 used with configurations disclosed herein may utilize any suitable image projection technology, such as a cathode ray tube (CRT), liquid crystal display (LCD), light-emitting diode (LED), gas plasma, electroluminescence, or the like. For example, 3D face models may be displayed on the display 1023. A display controller 1025 may also be provided for converting data stored in the memory 1003 into text, graphics and/or moving images (as appropriate) shown on the display 1023.

The electronic device 1001 may also include a transmitter (not shown) and a receiver (not shown) to allow transmission and reception of signals between the electronic device 1001 and a remote location (e.g., another electronic device, a wireless communication device, etc.). The transmitter and receiver may be collectively referred to as a transceiver. An antenna (not shown) may be electrically coupled to the transceiver. The electronic device 1001 may also include (not shown) multiple transmitters, multiple receivers, multiple transceivers and/or multiple antenna.

The various components of the electronic device 1001 may be coupled together by one or more buses, which may include a power bus, a control signal bus, a status signal bus, a data bus, etc. For simplicity, the various buses are illustrated in FIG. 10 as a bus system 1011.

In one configuration, a circuit may be adapted to generate a three-dimensional face. A first section of the circuit may be adapted to calculate an inverse depth map based on a depth map and an inverted first matrix. The inverted first matrix may be generated from two images in which pixels are aligned vertically and differ horizontally. In addition, the same circuit, a different circuit, a section of a different circuit or a second section of the same circuit may be adapted to normalize the inverse depth map to correct for distortions in the depth map caused by image rectification. Further, the same circuit, a different circuit, a section of a different circuit, or a third section of the same circuit may be adapted to generate a three-dimensional face model based on the inverse depth map and one of the two images.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible non-transitory storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 5-6 and 8-9, can be downloaded and/or otherwise obtained by a device. For example, an electronic device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for three-dimensional face generation, comprising:
   inverting, by an electronic device, a first homographic matrix corresponding to a first image of two uncalibrated stereo images to obtain an inverted first matrix;
   applying, by the electronic device, the inverted first matrix to a depth map to calculate an inverse depth map;
   normalizing, by the electronic device, the inverse depth map to correct for distortions in the depth map caused by image rectification, wherein normalizing the inverse depth map comprises:
   detecting a face, a right eye, and a left eye,
   modeling the face as an ellipse with a major axis and a minor axis,
   setting a first rectangle and a second rectangle, the first rectangle centered at the left eye and the second rectangle centered at the right eye, and
   adjusting a depth value about the major axis of the face until a difference between an average depth value for the first rectangle and an average depth value for the second rectangle is less than or equal to a threshold; and
   generating, by the electronic device, a three-dimensional face model based on the normalized inverse depth map and one of the two uncalibrated stereo images.

2. The method of claim 1, further comprising:
   obtaining a first matrix that corresponds to a first image of the two uncalibrated stereo images;
   obtaining a second matrix that corresponds to a second image of the two uncalibrated stereo images;
   applying the first matrix to the first image to obtain a first rectified image; and
   applying the second matrix to the second image to obtain a second rectified image.

3. The method of claim 2, wherein the first matrix is the first homographic matrix corresponding to the first image, and wherein the second matrix is a second homographic matrix corresponding to the second image.

4. The method of claim 2, further comprising determining the depth map from the first rectified image and the second rectified image.

5. The method of claim 2, further comprising determining a fundamental matrix from the two uncalibrated stereo images.

6. The method of claim 5, wherein obtaining the first matrix and the second matrix comprises decomposing the fundamental matrix.

7. The method of claim 1, wherein the two uncalibrated stereo images are different perspectives relative to a human face.

8. The method of claim 1, wherein normalizing the inverse depth map further comprises normalizing a subset of pixels in the inverse depth map.

9. The method of claim 1, wherein normalizing the inverse depth map further comprises one of rotating, tilting, and scaling the inverse depth map.

10. The method of claim 9, wherein tilting the inverse depth map comprises:
    determining depth derivatives for each column of pixels in a subset selection of the inverse depth map;
    determining, for the subset selection, a mean value of all the depth derivatives;
    comparing the mean value to a threshold value; and
    tilting the inverse depth map based on the comparison.

11. The method of claim 10, wherein the subset selection comprises a rectangular area.

12. The method of claim 10, wherein the subset selection comprises a first area and a second area, and wherein comparing comprises comparing a difference between the mean value of the first area and the mean value of the second area to a threshold value.

13. The method of claim 9, wherein rotating the inverse depth map comprises:
    adjusting the inverse depth map proportionally to make the first feature and the second feature horizontally level.

14. The method of claim 9, wherein scaling the inverse depth map comprises:
    adjusting the inverse depth map to make the first feature and the second feature proportionally even and at the same depth level.

15. The method of claim 1, wherein normalizing the inverse depth map further comprises:
  detecting a first feature and a second feature in the inverse depth map;
  adjusting the inverse depth map to make the first feature and the second feature the same size.

16. An apparatus for three-dimensional face generation, comprising:
  a processor;
  memory in electronic communication with the processor;
  instructions stored in the memory, the instructions being executable to:
  invert a first homographic matrix corresponding to a first image of two uncalibrated stereo images to obtain an inverted first matrix;
  apply the inverted first matrix to a depth map to calculate an inverse depth map;
  normalize the inverse depth map to correct for distortions in the depth map caused by image rectification, wherein the instructions being executable to normalize the inverse depth map comprise instructions being executable to:
    detect a face, a right eye, and a left eye,
    model the face as an ellipse with a major axis and a minor axis,
    set a first rectangle and a second rectangle, the first rectangle centered at the left eye and the second rectangle centered at the right eye, and
    adjust a depth value about the major axis of the face until a difference between an average depth value for the first rectangle and an average depth value for the second rectangle is less than or equal to a threshold; and
  generate a three-dimensional face model based on the normalized inverse depth map and one of the two uncalibrated stereo images.

17. The apparatus of claim 16, further comprising instructions executable to:
  obtain a first matrix that corresponds to a first image of the two uncalibrated stereo images;
  obtain a second matrix that corresponds to a second image of the two uncalibrated stereo images;
  apply the first matrix to the first image to obtain a first rectified image; and
  apply the second matrix to the second image to obtain a second rectified image.

18. The apparatus of claim 17, wherein the first matrix is the first homographic matrix corresponding to the first image, and wherein the second matrix is a second homographic matrix corresponding to the second image.

19. The apparatus of claim 17, further comprising instructions executable to determine the depth map from the first rectified image and the second rectified image.

20. The apparatus of claim 17, further comprising instructions executable to determine a fundamental matrix from the two uncalibrated stereo images.

21. The apparatus of claim 20, wherein the instructions being executable to obtain the first matrix and the second matrix comprise instructions being executable to decompose the fundamental matrix.

22. The apparatus of claim 16, wherein the two uncalibrated stereo images are different perspectives relative to a human face.

23. The apparatus of claim 16, wherein the instructions being executable to normalize the inverse depth map further comprise instructions being executable to normalize a subset of pixels in the inverse depth map.

24. The apparatus of claim 16, wherein the instructions being executable to normalize the inverse depth map further comprise one of instructions being executable to rotate, instructions being executable to tilt, and instructions being executable to scale the inverse depth map.

25. The apparatus of claim 24, wherein the instructions being executable to tilt the inverse depth map comprise instructions being executable to:
  determine depth derivatives for each column of pixels in a subset selection of the inverse depth map;
  determine, for the subset selection, a mean value of all the depth derivatives;
  compare the mean value to a threshold value; and
  tilt the inverse depth map based on the comparison.

26. The apparatus of claim 25, wherein the subset selection comprises a rectangular area.

27. The apparatus of claim 25, wherein the subset selection comprises a first area and a second area, and wherein the instructions being executable to compare comprise instructions being executable to compare a difference between the mean value of the first area and the mean value of the second area to a threshold value.

28. The apparatus of claim 24, wherein the instructions being executable to rotate the inverse depth map comprise instructions being executable to:
  adjust the inverse depth map proportionally to make the first feature and the second feature horizontally level.

29. The apparatus of claim 24, wherein the instructions being executable to scale the inverse depth map comprise instructions being executable to:
  adjust the inverse depth map to make the first feature and the second feature proportionally even and at the same depth level.

30. An electronic device for three-dimensional face generation, comprising:
  means for inverting a first homographic matrix corresponding to a first image of two uncalibrated stereo images to obtain an inverted first matrix;
  means for applying the inverted first matrix to a depth map to calculate an inverse depth map;
  means for normalizing the inverse depth map to correct for distortions in the depth map caused by image rectification, wherein the means for normalizing the inverse depth map comprises:
    means for detecting a face, a right eye, and a left eye,
    means for modeling the face as an ellipse with a major axis and a minor axis,
    means for setting a first rectangle and a second rectangle, the first rectangle centered at the left eye and the second rectangle centered at the right eye, and
    means for adjusting a depth value about the major axis of the face until a difference between an average depth value for the first rectangle and an average depth value for the second rectangle is less than or equal to a threshold; and
  means for generating a three-dimensional face model based on the normalized inverse depth map and one of the two uncalibrated stereo images.

31. The electronic device of claim 30, wherein the means for normalizing the inverse depth map further comprise means for normalizing a subset of pixels in the inverse depth map.

32. The electronic device of claim 30, wherein the means for normalizing the inverse depth map further comprise one of means for rotating, tilting, and scaling the inverse depth map.

33. The electronic device of claim 32, wherein the means for tilting the inverse depth map comprise:
- means for determining depth derivatives for each column of pixels in a subset selection of the inverse depth map;
- means for determining, for the subset selection, a mean value of all the depth derivatives;
- means for comparing the mean value to a threshold value; and
- means for tilting the inverse depth map based on the comparison.

34. The electronic device of claim 33, wherein the subset selection comprises a first area and a second area, and wherein the means for comparing comprise means for comparing a difference between the mean value of the first area and the mean value of the second area to a threshold value.

35. The electronic device of claim 32, wherein the means for rotating the inverse depth map comprises:
- means for adjusting the inverse depth map proportionally to make the first feature and the second feature horizontally level.

36. A non-transitory computer-readable medium having instructions thereon, the instructions comprising:
- code for causing an electronic device to invert a first homographic matrix corresponding to a first image of two uncalibrated stereo images to obtain an inverted first matrix;
- code for causing the electronic device to apply the inverted first matrix to a depth map to calculate an inverse depth map;
- code for causing the electronic device to normalize the inverse depth map to correct for distortions in the depth map caused by image rectification, wherein the code for causing the electronic device to normalize the inverse depth map comprises:
  - code for causing the electronic device to detect a face, a right eye, and a left eye,
  - code for causing the electronic device to model the face as an ellipse with a major axis and a minor axis,
  - code for causing the electronic device to set a first rectangle and a second rectangle, the first rectangle centered at the left eye and the second rectangle centered at the right eye, and
  - code for causing the electronic device to adjust a depth value about the major axis of the face until a difference between an average depth value for the first rectangle and an average depth value for the second rectangle is less than or equal to a threshold; and
- code for causing the electronic device to generate a three-dimensional face model based on the normalized inverse depth map and one of the two uncalibrated stereo images.

37. The non-transitory computer-readable medium of claim 36, wherein the code for causing the electronic device to normalize the inverse depth map further comprises code for causing the electronic device to normalize a subset of pixels in the inverse depth map.

38. The non-transitory computer-readable medium of claim 36, wherein the code for causing the electronic device to normalize the inverse depth map further comprises one of code for causing the electronic device to rotate, tilt, and scale the inverse depth map.

39. The non-transitory computer-readable medium of claim 38, wherein the code for causing the electronic device to tilt the inverse depth map comprises:
- code for causing the electronic device to determine depth derivatives for each column of pixels in a subset selection of the inverse depth map;
- code for causing the electronic device to determine, for the subset selection, a mean value of all the depth derivatives;
- code for causing the electronic device to compare the mean value to a threshold value; and
- code for causing the electronic device to tilt the inverse depth map based on the comparison.

40. The non-transitory computer-readable medium of claim 39, wherein the subset selection comprises a first area and a second area, and wherein comparing comprises comparing a difference between the mean value of the first area and the mean value of the second area to a threshold value.

41. The non-transitory computer-readable medium of claim 38, wherein the code for causing the electronic device to rotate the inverse depth map comprises:
- code for causing the electronic device to adjust the inverse depth map proportionally to make the first feature and the second feature horizontally level.

42. A method for three-dimensional face generation, comprising:
- obtaining, by an electronic device, a first and a second image of a face;
- determining, by the electronic device, a fundamental matrix from the first image and the second image;
- decomposing, by the electronic device, a first homography matrix corresponding to the first image and a second homography matrix corresponding to the second image from the fundamental matrix;
- rectifying, by the electronic device, the first image and the second image such that pixels are aligned vertically and differ horizontally by applying the first homography matrix to the first image and applying the second homography matrix to the second image;
- determining, by the electronic device, a depth map from the first rectified image and the second rectified image;
- determining, by the electronic device, a first matrix which projects the first image onto the common image plane;
- inverting, by the electronic device, the first matrix to obtain an inverted first matrix;
- applying, by the electronic device, the inverted first matrix to the depth map to calculate an inverse depth map;
- normalizing, by the electronic device, the inverse depth map to correct for distortions in the depth map caused by the image rectification, wherein normalizing the inverse depth map comprises:
  - initiating tilt adjustments;
  - performing face detection and eye detection;
  - modeling the face as an ellipse with a major axis and a minor axis;
  - setting one rectangle having a width of one third a length of the minor axis and a height of one half a length of the major axis co-centered with the ellipse;
  - calculating an average derivative value along a vertical direction of a face;
  - comparing whether an absolute value of the average derivative value is greater than a threshold; and
  - adjusting a depth value along the vertical direction of the face until the absolute value of the average derivative value is less than or equal to the threshold; and
- generating, by the electronic device, a three-dimensional face model based on the normalized inverse depth map and one of the two images.

43. A method for three-dimensional face generation, comprising:
- obtaining, by an electronic device, a first and a second image of a face;
- determining, by the electronic device, a fundamental matrix from the first image and the second image;
- decomposing, by the electronic device, a first homography matrix corresponding to the first image and a second homography matrix corresponding to the second image from the fundamental matrix;
- rectifying, by the electronic device, the first image and the second image such that pixels are aligned vertically and differ horizontally by applying the first homography matrix to the first image and applying the second homography matrix to the second image;
- determining, by the electronic device, a depth map from the first rectified image and the second rectified image;
- determining, by the electronic device, a first matrix which projects the first image onto the common image plane;
- inverting, by the electronic device, the first matrix to obtain an inverted first matrix;
- applying, by the electronic device, the inverted first matrix to the depth map to calculate an inverse depth map;
- normalizing, by the electronic device, the inverse depth map to correct for distortions in the depth map caused by the image rectification, wherein normalizing the inverse depth map comprises:
  - initiating tilt adjustments;
  - performing face detection and eye detection;
  - modeling the face as an ellipse with a major axis and a minor axis;
  - setting a first rectangle and a second rectangle, each with a width one third a length of the minor axis and a height one half a length of the major axis, centered at a forehead and a mouth area in the ellipse;
  - calculating a first average depth value for the first rectangle and a second average depth value for the second rectangle;
  - comparing whether an absolute value of a difference between the first average depth value and the second average depth value is greater than a threshold; and
  - adjusting a depth value along a vertical direction of a face until the absolute value of the difference between the first average depth value and the second average depth value is less than or equal to the threshold; and
- generating, by the electronic device, a three-dimensional face model based on the normalized inverse depth map and one of the two images.

44. A method for three-dimensional face generation, comprising:
- obtaining, by an electronic device, a first and a second image of a face;
- determining, by the electronic device, a fundamental matrix from the first image and the second image;
- decomposing, by the electronic device, a first homography matrix corresponding to the first image and a second homography matrix corresponding to the second image from the fundamental matrix;
- rectifying, by the electronic device, the first image and the second image such that pixels are aligned vertically and differ horizontally by applying the first homography matrix to the first image and applying the second homography matrix to the second image;
- determining, by the electronic device, a depth map from the first rectified image and the second rectified image;
- determining, by the electronic device, a first matrix which projects the first image onto the common image plane;
- inverting, by the electronic device, the first matrix to obtain an inverted first matrix;
- applying, by the electronic device, the inverted first matrix to the depth map to calculate an inverse depth map;
- normalizing, by the electronic device, the inverse depth map to correct for distortions in the depth map caused by the image rectification, wherein normalizing the inverse depth map comprises:
  - initiating rotation adjustments;
  - performing face detection and eye detection;
  - modeling the face as an ellipse with a major axis and a minor axis;
  - setting a first rectangle and a second rectangle, the first rectangle centered at a left eye and the second rectangle centered at a right eye, each having a width of one quarter a length of the minor axis and a height one eighth a length of the major axis;
  - calculating a first average depth value for the first rectangle and a second average depth value for the second rectangle;
  - comparing whether an absolute value of a difference between the first average depth value and the second average depth value is greater than a threshold; and
  - adjusting the depth value along the horizontal direction of the face until the absolute value of the difference between the first average depth value and the second average depth value is less than or equal to the threshold; and
- generating, by the electronic device, a three-dimensional face model based on the normalized inverse depth map and one of the two images.

* * * * *